US012509883B1

(12) United States Patent
Hao

(10) Patent No.: US 12,509,883 B1
(45) Date of Patent: Dec. 30, 2025

(54) COMPOSITE AEROGEL PANEL OF ALUMINUM ALLOY HONEYCOMB PANEL WITH DECORATIVE AND THERMAL INSULATION EFFECTS AND PREPARATION METHOD THEREOF

(71) Applicant: Bill Panel and Decoration LLC, Monterey Park, CA (US)

(72) Inventor: Haitao Hao, Monterey Park, CA (US)

(73) Assignee: Bill Panel and Decoration LLC, Monterey Park, CA (US)

( * ) Notice: Subject to any disclaimer, the term of this patent is extended or adjusted under 35 U.S.C. 154(b) by 0 days.

(21) Appl. No.: 19/186,797

(22) Filed: Apr. 23, 2025

(51) Int. Cl.
| | |
|---|---|
| *E04F 13/08* | (2006.01) |
| *B29B 7/00* | (2006.01) |
| *B29C 48/00* | (2019.01) |
| *B29C 48/08* | (2019.01) |
| *B29K 23/00* | (2006.01) |
| *B29L 7/00* | (2006.01) |
| *B32B 3/12* | (2006.01) |
| *B32B 15/085* | (2006.01) |
| *B32B 15/20* | (2006.01) |
| *B32B 27/08* | (2006.01) |
| *B32B 27/32* | (2006.01) |
| *B32B 37/10* | (2006.01) |
| *B32B 37/24* | (2006.01) |

(52) U.S. Cl.
CPC .......... *E04F 13/0875* (2013.01); *B29B 7/002* (2013.01); *B29C 48/022* (2019.02); *B29C 48/08* (2019.02); *B32B 3/12* (2013.01); *B32B 15/085* (2013.01); *B32B 15/20* (2013.01); *B32B 27/08* (2013.01); *B32B 27/32* (2013.01); *B32B 37/10* (2013.01); *B32B 37/24* (2013.01); *B29K 2023/12* (2013.01); *B29L 2007/002* (2013.01); *B32B 2037/243* (2013.01); *B32B 2255/06* (2013.01); *B32B 2255/20* (2013.01); *B32B 2264/1021* (2020.08); *B32B 2305/38* (2013.01); *B32B 2307/304* (2013.01); *B32B 2309/02* (2013.01); *B32B 2309/04* (2013.01); *B32B 2309/12* (2013.01); *B32B 2311/24* (2013.01); *B32B 2323/10* (2013.01); *B32B 2607/00* (2013.01)

(58) Field of Classification Search
CPC . B32B 2266/128; B32B 3/12; B32B 2311/24; B32B 15/20; B32B 2307/302
See application file for complete search history.

(56) References Cited

U.S. PATENT DOCUMENTS

| | | | | |
|---|---|---|---|---|
| 4,550,141 | A * | 10/1985 | Hoh | B32B 27/30 |
| | | | | 525/196 |
| 6,099,683 | A * | 8/2000 | Meier | B32B 7/12 |
| | | | | 428/116 |
| 2004/0249046 | A1* | 12/2004 | Abhari | C09J 123/10 |
| | | | | 525/223 |
| 2018/0022056 | A1* | 1/2018 | Shen | F16F 1/37 |
| | | | | 428/117 |

FOREIGN PATENT DOCUMENTS

| | | | | |
|---|---|---|---|---|
| CN | 114889252 B | * | 4/2023 | |
| JP | 2005-525454 A | * | 8/2005 | .......... B01J 13/0091 |
| WO | WO-2017094254 A1 | * | 6/2017 | ............. B32B 17/04 |

OTHER PUBLICATIONS

CN 114889252 B Machine Translation (Year: 2022).*
Bandarra et al., "Antioxidant Synergy of alpha-Tocopherols and Phospholipids," JOACS, vol. 75., No. 8, 1999 (Year: 1999).*
Issenhuth, "The Antioxidant Role of Vitamin E in Polyolefins," Doctoral Thesis, University of Aston in Birmingham, May 1996 (Year: 1996).*
WO 2017/094254 A1 Machine Translation (Year: 2017).*
JP 2005-525454 A, Machine Translation (Year: 2005).*

* cited by examiner

*Primary Examiner* — Frank J Vineis
*Assistant Examiner* — Nicole T Gugliotta
(74) *Attorney, Agent, or Firm* — Cooper Legal Group, LLC

(57) ABSTRACT

The present application relates to the technical field of composite aerogel panels, and specifically discloses a composite aerogel panel of an aluminum alloy honeycomb panel with decorative and thermal insulation effects and a preparation method thereof. The composite aerogel panel provided in the present application, includes the following layers from inside to outside: an aerogel thermal insulation coating layer, a first aluminum alloy plate layer, a first polypropylene hot-melt film layer, an aluminum alloy honeycomb core layer, a second polypropylene hot-melt film layer, a second aluminum alloy plate layer, a third polypropylene hot-melt film layer, and a polypropylene decorative film layer. The composite aerogel panel of the aluminum alloy honeycomb panel of the present application integrates the effects of thermal insulation, hydrophobicity, decoration, and mechanical properties.

9 Claims, No Drawings

COMPOSITE AEROGEL PANEL OF ALUMINUM ALLOY HONEYCOMB PANEL WITH DECORATIVE AND THERMAL INSULATION EFFECTS AND PREPARATION METHOD THEREOF

TECHNICAL FIELD

The present application relates to the technical field of composite aerogel panels and specifically relates to a composite aerogel panel of an aluminum alloy honeycomb panel with decorative and thermal insulation effects and a preparation method thereof.

BACKGROUND ART

Traditionally, indoor wall thermal insulation materials and decorative materials are installed through separate construction processes, and the common practice is that appropriate gypsum boards are selected as thermal insulation materials and fixed on a wooden house frame, and joints between the gypsum boards can be sealed by manually applying gypsum putty. Then, the overall wall surface is made smooth by manually applying gypsum putty 2-3 times. Each application must wait until the previous one is completely dry before proceeding to ensure the decoration construction quality and decorative effect of the outer layer. The decorative materials are usually selected from paints or varnishes, which need to be applied 2-3 times to achieve the decorative effect. This method is cumbersome in process, takes a long time to prepare, and increases labor costs. In addition, commonly used gypsum boards and paints are made from inorganic materials, which have the characteristics of absorbing moisture when wet and evaporating moisture when dry, inevitably causing deformation and detachment, and often requiring repair. These defects limit the use of insulation materials for interior wall.

SUMMARY

In order to solve the above technical problem, the present application provides a composite aerogel panel of an aluminum alloy honeycomb panel with decorative and thermal insulation effects and a preparation method thereof.

In a first aspect, the present application provides a composite aerogel panel of an aluminum alloy honeycomb panel with decorative and thermal insulation effects, including the following layers from inside to outside: an aerogel thermal insulation coating layer, a first aluminum alloy plate layer, a first polypropylene hot-melt film layer, an aluminum alloy honeycomb core layer, a second polypropylene hot-melt film layer, a second aluminum alloy plate layer, a third polypropylene hot-melt film layer, and a polypropylene decorative film layer; wherein
  a coating for the aerogel thermal insulation coating layer is made from the following components in parts by weight: 60-80 parts of silica aerogel particles, 20-30 parts of polyurethane, 10-20 parts of a resin, 1.5-2.5 parts of a glass fiber, and 0.6-0.8 parts of a fluoride; and
  the first polypropylene hot-melt film layer, the second polypropylene hot-melt film layer, and the third polypropylene hot-melt film layer are the same and are all made from the following components in parts by weight: 80-90 parts of polypropylene, 10-18 parts of a vinyl alcohol-ethylene copolymer, 4-12 parts of a terpene resin, 1-2 parts of zinc stearate, and 1.2-3.5 parts of an antioxidant.

In the present application, the material composition of the composite aerogel panel of the aluminum alloy honeycomb panel is made up of one upper and one lower aluminum alloy plate, one upper and one lower polypropylene hot-melt film as a bonding material, and an aluminum alloy honeycomb core in the middle layer. The polypropylene hot-melt films are melted by heating and pressurizing, thereby bonding the aluminum alloy plates and the aluminum alloy honeycomb core into the aluminum alloy honeycomb panel. A polypropylene decorative film is coated on one side (decorative side) of the aluminum alloy honeycomb panel, with a polypropylene hot-melt film between the polypropylene decorative film and the aluminum alloy honeycomb panel. The polypropylene hot-melt film is melted by heating and pressurizing so as to bond the polypropylene decorative film and the aluminum alloy honeycomb panel together to form a decorative surface layer of the aluminum alloy honeycomb panel. The other side (thermal insulation side) of the aluminum alloy honeycomb panel is sprayed with a special aerogel insulation coating, giving the aluminum alloy honeycomb panel excellent thermal insulation function. When installing and using aluminum alloy honeycomb panels, sealing adhesives (such as phenolic resin) are used to seal between the panels, achieving the thermal insulation and decorative effect of the overall wall surface using aluminum alloy honeycomb panels.

In the coating for the aerogel thermal insulation coating layer: the silica aerogel particles have a unique three-dimensional nano-network structure, which has good thermal insulation performance. The glass fiber can increase the crack resistance and bending resistance of the coating, and improve the mechanical strength and durability of the coating. The fluoride can improve the water resistance and weather resistance of the coating, and then improve the aging resistance of the coating. The polyurethane acts as a binder and can further improve the mechanical strength, water resistance, chemical resistance, and workability of the coating while assisting in the thermal insulation effect of the aerogel. The above technical solution greatly improves the service life of the aerogel thermal insulation coating layer.

In the polypropylene hot-melt film layer: in the present application, specific parts by weight of the polypropylene, vinyl alcohol-ethylene copolymer, terpene resin, zinc stearate, and antioxidant are selected as raw material components to prepare the polypropylene hot-melt film layer, so as to provide excellent adhesion performance and adhesion durability, and ensure the thermal insulation and mechanical properties of the composite aerogel panel of the aluminum alloy honeycomb panel at the same time.

Preferably, the coating for the aerogel thermal insulation coating layer is made from the following components in parts by weight: 65-75 parts of the silica aerogel particles, 22-28 parts of the polyurethane, 13-17 parts of a phenolic resin, 1.7-2.2 parts of the glass fiber, and 0.65-0.75 parts of the fluoride.

Preferably, in the coating for the aerogel thermal insulation coating layer, the fluoride is one or more selected from a group consisting of: ammonium fluoride, tetramethylammonium fluoride, and tetrabutylammonium fluoride.

Preferably, in the coating for the aerogel thermal insulation coating layer, the resin is composed by mixing a C9 petroleum resin and a rosin-modified phenolic resin in a weight ratio of 9:(0.5-2).

Preferably, in the coating for the aerogel thermal insulation coating layer, the resin is composed by mixing the C9 petroleum resin and the rosin-modified phenolic resin in a weight ratio of 9:(0.8-1.5).

Preferably, the coating for the aerogel thermal insulation coating layer is prepared by a method including: dispersing the silica aerogel particles, glass fiber, fluoride, and resin in an organic solvent and stirring for 15-40 min at a speed of 1000-1500 rpm, then adding the polyurethane and stirring to obtain the coating for the aerogel thermal insulation coating layer.

Preferably, the first polypropylene hot-melt film layer, the second polypropylene hot-melt film layer, and the third polypropylene hot-melt film layer are all composed of the following components in parts by weight: 82-88 parts of the polypropylene, 12-16 parts of the vinyl alcohol-ethylene copolymer, 6-10 parts of the terpene resin, 1.2-1.8 parts of the zinc stearate, and 1.5-3 parts of the antioxidant.

Preferably, in the first polypropylene hot-melt film layer, the second polypropylene hot-melt film layer, and the third polypropylene hot-melt film layer, the antioxidant is composed of vitamin E and a vegetable phospholipid in a weight ratio of 0.3-0.5:1-3. During the test, the applicant found that in the polypropylene hot-melt film layer, the vitamin E can improve the oxidation resistance of the polypropylene hot-melt film, and increase the service life; the plant phospholipid can improve the dispersion stability of each component, and synergistically used with the vitamin E to significantly improve the anti-oxidation performance of the polypropylene hot-melt film. In this technology, the vitamin E and plant phospholipid are added in proper proportion. These two antioxidants are stable in daily life, safe and environment-friendly, and can greatly improve the bonding performance and bonding durability of the polypropylene hot-melt film, so that the service life of the aluminum alloy honeycomb panel can reach more than 15 years.

Preferably, the first polypropylene hot-melt film layer, the second polypropylene hot-melt film layer, and the third polypropylene hot-melt film layer are all prepared by a method including: feeding each component into a mixer, controlling a speed of the mixer at 1000-2000 r/min, then stirring and mixing for 20-50 min at a temperature of 100-140° C. to prepare a mixture; feeding the mixture into an extruder, controlling a processing temperature at 210-235° C. and a screw temperature at 210-240° C., and performing melt extrusion.

Preferably, a thickness of the aerogel thermal insulation coating layer is 2-4 mm; a thickness of the first aluminum alloy plate layer and the second aluminum alloy plate layer are the same, both being 0.3-0.8 mm; a thicknesses of the first polypropylene hot-melt film layer, the second polypropylene hot-melt film layer and the third polypropylene hot-melt film layer are the same, all being 0.02-0.08 mm; a thickness of the aluminum alloy honeycomb core layer is 8-17 mm; and a thickness of the polypropylene decorative film layer is 0.4-2 mm.

In a second aspect, the present application provides a method for preparing the composite aerogel panel of the aluminum alloy honeycomb panel, including the following steps:
(1) taking aluminum foils, stacking and placing the aluminum foils in a criss-cross structure by using a manual laying process, ensuring no gaps between the aluminum foils and keeping all edges of the aluminum foils neat, to obtain the aluminum alloy honeycomb core layer;
(2) respectively laying one polypropylene hot-melt film layer formed by melt extrusion on upper and lower sides of the aluminum alloy honeycomb core layer to form the first polypropylene hot-melt film layer and the second polypropylene hot-melt film layer on the upper and lower sides of the aluminum alloy honeycomb core layer respectively, and then laying the first aluminum alloy plate layer on the first polypropylene hot-melt film layer, laying the second aluminum alloy plate layer on the second polypropylene hot-melt film layer, and performing pre-pressing molding, wherein process parameters for the pre-pressing molding include a pre-pressing temperature of 90-110° C., a pressure of 1-1.5 MPa, and a time of 70-120 min;
(3) laying one polypropylene hot-melt film layer formed by melt extrusion on the second aluminum alloy plate layer to form the third polypropylene hot-melt film layer, then coating the polypropylene decorative film layer on the third polypropylene hot-melt film layer, and performing hot-pressing molding;
wherein process parameters for the hot-pressing molding include a hot-pressing temperature of 70-90° C., a pressure of 0.6-1 MPa, and a time of 30-60 min;
(4) coating the coating for the aerogel thermal insulation coating layer on the first aluminum alloy plate layer, drying and solidifying at room temperature to form a pre-fabricated panel;
(5) conveying the pre-fabricated panel to a steam curing drying chamber for drying by a conveying device and then trimming to obtain the composite aerogel panel of the aluminum alloy honeycomb panel.

In summary, the technical solution of the present application has the following effects.

The composite aerogel panel of the aluminum alloy honeycomb panel prepared by using the technical solution of the present application integrates the effects of thermal insulation, hydrophobicity, decoration, and mechanical properties. The preparation method is simple and has a broad application prospect.

In the technical solution used in the present application, the decoration and thermal insulation are combined together. During the construction of the aluminum alloy honeycomb panel, a transverse aluminum alloy keel is mounted and fixed on a wooden house frame or a concrete wall surface and is levered. A pendant is fixedly mounted on a thermal insulation surface of the aluminum alloy honeycomb panel. The installation of the pendant does not destroy the thermal insulation effect. The aluminum alloy honeycomb panels with fixed pendants are successively hung on the aluminum alloy keel so that the thermal insulation and decorative functions of the wall surface can be achieved. It can save labor costs by more than 50% and material costs by more than 20%.

The composite aerogel panel of the aluminum alloy honeycomb panel provided in the present application is waterproof and moisture-proof and does not deform and peel off. The composite aerogel panel of the aluminum alloy honeycomb panel is composed of aluminum metal, polypropylene, and aerogel material, and has stable performance in a humid environment and will not deform and peel off.

The composite aerogel panel of the aluminum alloy honeycomb panel provided in the present application has good fire resistance and is strong and durable. The aluminum alloy materials do not burn unless under extremely special conditions. The composite aerogel panel of the aluminum alloy honeycomb panel has stable performance and can be used for more than 15 years, while materials of conventional methods require extensive replacement and repair after 5-8 years of use.

The raw materials and the production process of the composite aerogel panel of the aluminum alloy honeycomb panel provided in the present application are completely environmentally friendly and do not generate harmful gases. The panels are convenient to replace. When it is necessary to adjust the decoration style, it is only necessary to directly replace the whole panel, which is convenient and fast. All the aluminum alloy materials of replaced panels can be recycled and reused.

DETAILED DESCRIPTION

The present application is described in further detail below in connection with examples, comparative examples, and performance testing tests, which should not be construed as limiting the scope of the present application as claimed.

The aluminum alloy plate layers were purchased from Henan Mingtai Al. Industrial Co., Ltd. The polypropylene decorative film layers were purchased from Tian'an New Material; silica aerogel particles (CPA-100PX aerogel powder with a diameter of 10-50 μm) were purchased from Zhongshan Chempons Materials Technology Co., Ltd.; polyurethane (Item No. chb105) was purchased from Yantai Caihua Polyurethane Technology Co. Ltd.; rosin modified phenolic resin (Item No. 009) was purchased from Jinan Dahui Chemical Technology Co. Ltd.; polypropylene (homopolymer masterbatch, model No. FC801) was purchased from Sinopec Shanghai Petrochemical Co., Ltd.; vinyl alcohol-ethylene copolymer and ethylene propylene copolymer were purchased from Shanghai Meryer Biochemical Technology Co. Ltd.; C9 petroleum resin, C5 petroleum resin, terpene resin and coumarone resin were purchased from Puyang Kairuide Petroleum Resin Co. Ltd.

EXAMPLES

Examples 1-5

Examples 1-5 respectively provided a composite aerogel panel of an aluminum alloy honeycomb panel and a preparation methods thereof.

The examples above differed in that: the amounts of each component used in the coatings for the aerogel thermal insulation coating layers varied. The specific details are as follows.

In Example 1: the coating for the aerogel thermal insulation coating layer was made from the following components in parts by weight: silica aerogel particles 70 g, polyurethane 25 g, resin (the resin was composed by mixing a C9 petroleum resin and a rosin-modified phenolic resin in a weight ratio of 9:1) 15 g, glass fiber 2 g, and fluoride (tetramethylammonium fluoride) 0.7 g.

In Example 2: the coating for the aerogel thermal insulation coating layer was made from the following components in parts by weight: silica aerogel particles 65 g, polyurethane 28 g, resin (the resin was composed by mixing a C9 petroleum resin and a rosin-modified phenolic resin in a weight ratio of 9:1) 13 g, glass fiber 1.7 g, and fluoride (tetramethylammonium fluoride) 0.75 g.

In Example 3: the coating for the aerogel thermal insulation coating layer was made from the following components in parts by weight: silica aerogel particles 75 g, polyurethane 22 g, resin (the resin was composed by mixing a C9 petroleum resin and a rosin-modified phenolic resin in a weight ratio of 9:1) 17 g, glass fiber 2.2 g, and fluoride (tetramethylammonium fluoride) 0.65 g.

In Example 4: the coating for the aerogel thermal insulation coating layer was made from the following components in parts by weight: silica aerogel particles 60 g, polyurethane 30 g, resin (the resin was composed by mixing a C9 petroleum resin and a rosin-modified phenolic resin in a weight ratio of 9:1) 10 g, glass fiber 1.5 g, and fluoride (tetramethylammonium fluoride) 0.8 g.

In Example 5: the coating for the aerogel thermal insulation coating layer was made from the following components in parts by weight: silica aerogel particles 80 g, polyurethane 20 g, resin (the resin was composed by mixing a C9 petroleum resin and a rosin-modified phenolic resin in a weight ratio of 9:1) 20 g, glass fiber 2.5 g, and fluoride (tetramethylammonium fluoride) 0.6 g.

In the above examples, the composite aerogel panel of the aluminum alloy honeycomb panel included the following layers from inside to outside: an aerogel thermal insulation coating layer (with a thickness of 0.6 mm), a first aluminum alloy plate layer (with a thickness of 0.5 mm), a first polypropylene hot-melt film layer (with a thickness of 0.04 mm), and an aluminum alloy honeycomb core layer (made from aluminum foil with a thickness of 0.035-0.06 mm; with a thickness of 0.4 mm), a second polypropylene hot-melt film layer (with a thickness of 0.04 mm), a second aluminum alloy plate layer (with a thickness of 0.5 mm), a third polypropylene hot-melt film layer (with a thickness of 0.04 mm), and a polypropylene decorative film layer (with a thickness of 1 mm).

The method for preparing the composite aerogel panel of the aluminum alloy honeycomb panel included the following steps.

(1) The aluminum foils were taken, then stacked and placed in a criss-cross structure by using a manual laying process. It was ensured that no gaps between the aluminum foils and all edges of the aluminum foils were kept neat to obtain the aluminum alloy honeycomb core layer.

(2) One polypropylene hot-melt film layer formed by melt extrusion was respectively layered on upper and lower sides of the aluminum alloy honeycomb core layer using a special machine. Thus, the first polypropylene hot-melt film layer and the second polypropylene hot-melt film layer were respectively formed on the upper and lower sides of the aluminum alloy honeycomb core layer. Then, the first aluminum alloy plate layer was layered on the first polypropylene hot-melt film layer and the second aluminum alloy plate layer was layered on the second polypropylene hot-melt film layer. A pre-pressing molding was performed, wherein process parameters for the pre-pressing molding included a pre-pressing temperature of 90-110° C., a pressure of 1-1.5 MPa, and a time of 70-120 min.

The polypropylene hot-melt film layer was prepared by a method including the following steps: 85 g of polypropylene, 14 g of a vinyl alcohol-ethylene copolymer, 8 g of a terpene resin, 1.5 g of zinc stearate, and 2 g of an antioxidant (composed of vitamin E and a plant phospholipid (phosphatidyl inositol) in a weight ratio of 0.4:2) were fed into a mixer. A speed of the mixer was controlled at 1500 r/min, and then stirred and mixed for 30 min at a temperature of 120° C. to prepare a mixture. The mixture was fed into an extruder. A processing temperature was controlled at 220° C., and masterbatchs were formed through melt extrusion, and then a screw temperature was controlled at 220° C., and the masterbatchs were cast into a film.

(3) One polypropylene hot-melt film layer formed by melt extrusion (the same as the preparation method of the polypropylene hot-melt film layer in step (2)) was layered on the second aluminum alloy plate layer to form the third polypropylene hot-melt film layer. Then, the polypropylene decorative film layer was coated on the third polypropylene hot-melt film layer, and a hot-pressing molding was performed.

Process parameters for the hot-pressing molding included a hot-pressing temperature of 80° C., a pressure of 0.8 MPa, and a time of 45 min.

(4) The coating for the aerogel thermal insulation coating layer was coated on the first aluminum alloy plate layer, then dried and solidified at room temperature to form a pre-fabricated panel.

The coating for the aerogel thermal insulation coating layer was prepared by a method including the following steps: silica aerogel particles, a glass fiber (specification: a length of 2.5-3.5 mm, a diameter of 6-8 µm), a fluoride, a resin, and an antioxidant were uniformly dispersed in 100 g of n-hexane, and stirred at a speed of 1200 rpm for 20 min. Then, polyurethane was added and stirred to obtain the coating for the aerogel thermal insulation coating layer.

(5) The pre-fabricated panel was conveyed to a steam curing drying chamber and dried for 48 hours by a conveying device. Then, the pre-fabricated panel was trimmed by a cutting and patching method, so that the surface of the pre-fabricated panel was tightly bonded, flat, and smooth to prepare the composite aerogel panel of the aluminum alloy honeycomb panel.

Examples 6-10

Examples 6-10 respectively provided a composite aerogel panel of an aluminum alloy honeycomb panel and a preparation method thereof.

The above examples differed from Example 1 in that: the types of resins or fluorides in the coating for the aerogel thermal insulation coating layer varied. The specific details are as follows.

In Example 6: the resin was composed by mixing a C5 petroleum resin and a rosin-modified phenolic resin in a weight ratio of 9:1.

In Example 7: the resin was composed by mixing a C9 petroleum resin and a rosin-modified phenolic resin in a weight ratio of 1:9.

In Example 8: the resin was composed by mixing a C9 petroleum resin and a rosin-modified phenolic resin in a weight ratio of 9:0.8.

In Example 9: the resin was composed by mixing a C9 petroleum resin and a rosin-modified phenolic resin in a weight ratio of 9:2.

In Example 10: the fluoride is tetrabutylammonium fluoride.

The other process parameters in the above examples were the same as those in Example 1.

Examples 11-16

Examples 11-16 respectively provided a composite aerogel panel of an aluminum alloy honeycomb panel and a preparation method thereof.

The above examples differed from Example 1 in that: the antioxidants in the polypropylene hot-melt film layer or the preparation methods varied. The specific details are as follows.

In Example 11: the antioxidant was dibutyl hydroxytoluene.

In Example 12: the antioxidant was composed of vitamin E and a plant phospholipid (phosphatidyl inositol) in a weight ratio of 2:0.4.

In Example 13: the antioxidant was composed of vitamin E and a plant phospholipid (phosphatidyl inositol) in a weight ratio of 0.3:3.

In Example 14: the antioxidant was composed of vitamin E and a plant phospholipid (phosphatidyl inositol) in a weight ratio of 0.5:1.

In Example 15: 80 g of polypropylene, 18 g of a vinyl alcohol-ethylene copolymer, 4 g of a terpene resin, and 2 g of zinc stearate were fed into a mixer.

In Example 16: 90 g of polypropylene, 10 g of a vinyl alcohol-ethylene copolymer, 12 g of a terpene resin, and 1 g of zinc stearate were fed into a mixer.

The other process parameters in the above examples were the same as those in Example 1.

COMPARATIVE EXAMPLES

Comparative Examples 1-4

Comparative Examples 1~4 respectively provided a composite aerogel panel of an aluminum alloy honeycomb panel and a preparation method thereof.

The above comparative examples differed from Example 1 in that: the coatings for the aerogel thermal insulation coating layers or the preparation methods of the polypropylene hot-melt film layer varied. The specific details are as follows.

In Comparative Example 1: the coating for the aerogel thermal insulation coating layer was made from the following components: silica aerogel particles 90 g, polyurethane 15 g, phenolic resin (the resin was composed by mixing a C9 petroleum resin and a rosin-modified phenolic resin in a weight ratio of 9:1) 25 g, glass fiber 1 g, and fluoride (tetramethylammonium fluoride) 1.2 g.

In Comparative Example 2: the coating for the aerogel thermal insulation coating layer was made from the following components: silica aerogel particles 90 g, polyurethane 15 g, glass fiber 1 g, and fluoride (tetramethylammonium fluoride) 1.2 g.

In Comparative Example 3: the polypropylene hot-melt film layer was prepared by mixing 75 g of polypropylene, 25 g of a vinyl alcohol-ethylene copolymer, 16 g of a terpene resin, 0.5 g of zinc stearate, and 0.8 g of an antioxidant (composed of vitamin E and a plant phospholipid (phosphatidyl inositol) in a weight ratio of 0.4:2).

In Comparative Example 4: the polypropylene hot-melt film layer was prepared by mixing 80 g of polypropylene, 18 g of ethylene propylene copolymer, 4 g of coumarone resin, 2 g of zinc stearate, and 0.8 g of an antioxidant (composed of vitamin E and a plant phospholipid (phosphatidyl inositol) in a weight ratio of 0.4:2).

The other process parameters in the above comparative examples were the same as those in Example 1.

Performance Testing Test (1) Thermal Conductivity: the test was carried out according to the method specified in GB/T10294.

(2) Hydrophobic angle of aerogel thermal insulation coating layer: the test was carried out according to the method specified in GB/T 42694.

(3) Flexural strength: the test was carried out according to the method specified in GB/T 8812.2-2007.

Test results are shown in Table 1.

TABLE 1

Performance test results of composite aerogel panels of the aluminum alloy honeycomb panel in the examples and comparative examples

| Test object | | Test result | | |
|---|---|---|---|---|
| | | Thermal Conductivity (W/(m · K)) | Hydrophobic angle (°) | Flexural strength (MPa) |
| Examples | 1 | 0.0132 | 142.6 | 24.8 |
| | 2 | 0.0142 | 145.8 | 25.5 |
| | 3 | 0.0138 | 141.7 | 24.0 |
| | 4 | 0.0152 | 138.5 | 23.4 |
| | 5 | 0.0154 | 140.3 | 22.9 |
| | 6 | 0.0165 | 132.0 | 20.0 |
| | 7 | 0.0169 | 131.5 | 19.6 |
| | 8 | 0.0138 | 142.6 | 24.7 |
| | 9 | 0.0140 | 143.0 | 25.1 |
| | 10 | 0.0151 | 138.2 | 22.3 |
| | 11 | 0.0166 | / | 20.1 |
| | 12 | 0.0170 | / | 19.8 |
| | 13 | 0.0139 | / | 24.7 |
| | 14 | 0.0143 | / | 24.3 |
| | 15 | 0.0153 | / | 22.1 |
| | 16 | 0.0155 | / | 21.8 |
| Comparative Examples | 1 | 0.0182 | 130.0 | 18.4 |
| | 2 | 0.0190 | 128.5 | 17.5 |
| | 3 | 0.0179 | / | 17.6 |
| | 4 | 0.0181 | / | 18.4 |

"/" indicates that the corresponding performance test was not performed.

Referring to Table 1, by comparing the test results of the examples and the comparative examples, it can be seen that the composite aerogel panels of the aluminum alloy honeycomb panel prepared by using the technical solution of the present application fully exerts the thermal insulation property of the composite aerogel panel, and integrates the effects of thermal insulation, hydrophobicity, decoration, and mechanical properties. The preparation method is simple, and solves the problems of poor thermal insulation properties, easy water absorption and expansion, and complicated preparation method of the traditional panel material, and has a broad application prospect.

While the present application has been described in detail in the foregoing general description and specific embodiments, it will be apparent to those skilled in the art that certain modifications or improvements can be made thereto on the basis of the present application. Therefore, all modifications or improvements made without departing from the spirit of the present invention are all within the scope claimed by the present application.

What is claimed is:

1. A composite aerogel panel of an aluminum alloy honeycomb panel with decorative and thermal insulation effects, comprising the following layers from inside to outside: an aerogel thermal insulation coating layer, a first aluminum alloy plate layer, a first polypropylene hot-melt film layer, an aluminum alloy honeycomb core layer, a second polypropylene hot-melt film layer, a second aluminum alloy plate layer, a third polypropylene hot-melt film layer, and a polypropylene decorative film layer; wherein
a coating for the aerogel thermal insulation coating layer is made from the following components in parts by weight: 60-80 parts of silica aerogel particles, 20-30 parts of polyurethane, 10-20 parts of a resin, 1.5-2.5 parts of a glass fiber, and 0.6-0.8 parts of a fluoride; the first polypropylene hot-melt film layer, the second polypropylene hot-melt film layer, and the third polypropylene hot-melt film layer have a same composition and are all made from the following components in parts by weight: 80-90 parts of polypropylene, 10-18 parts of a vinyl alcohol-ethylene copolymer, 4-12 parts of a terpene resin, 1-2 parts of zinc stearate, and 1.2-3.5 parts of an antioxidant; and
in the coating for the aerogel thermal insulation coating layer, the resin is composed by mixing a C9 petroleum resin and a rosin-modified phenolic resin in a weight ratio of 9:(0.5-2).

2. The composite aerogel panel of the aluminum alloy honeycomb panel according to claim 1, wherein the resin is a phenolic resin, and the coating for the aerogel thermal insulation coating layer is made from the following components in parts by weight: 65-75 parts of the silica aerogel particles, 22-28 parts of the polyurethane, 13-17 parts of the phenolic resin, 1.7-2.2 parts of the glass fiber, and 0.65-0.75 parts of the fluoride.

3. The composite aerogel panel of the aluminum alloy honeycomb panel according to claim 1, wherein in the coating for the aerogel thermal insulation coating layer, the fluoride is one or more selected from a group consisting of: ammonium fluoride, tetramethylammonium fluoride, and tetrabutylammonium fluoride.

4. The composite aerogel panel of the aluminum alloy honeycomb panel according to claim 1, wherein the coating for the aerogel thermal insulation coating layer is prepared by a method comprising: dispersing the silica aerogel particles, the glass fiber, the fluoride, and the resin in an organic solvent and stirring for 15-40 min at a speed of 1000-1500 rpm, then adding the polyurethane and stirring to obtain the coating for the aerogel thermal insulation coating layer.

5. The composite aerogel panel of the aluminum alloy honeycomb panel according to claim 1, wherein the first polypropylene hot-melt film layer, the second polypropylene hot-melt film layer, and the third polypropylene hot-melt film layer are all made from the following components in parts by weight: 82-88 parts of the polypropylene, 12-16 parts of the vinyl alcohol-ethylene copolymer, 6-10 parts of the terpene resin, 1.2-1.8 parts of the zinc stearate, and 1.5-3 parts of the antioxidant.

6. The composite aerogel panel of the aluminum alloy honeycomb panel according to claim 1, wherein in the first polypropylene hot-melt film layer, the second polypropylene hot-melt film layer, and the third polypropylene hot-melt film layer, the antioxidant is composed of vitamin E and a plant phospholipid in a weight ratio of (0.3-0.5):(1-3).

7. The composite aerogel panel of the aluminum alloy honeycomb panel according to claim 1, wherein the first polypropylene hot-melt film layer, the second polypropylene hot-melt film layer, and the third polypropylene hot-melt film layer are all prepared by a method comprising: feeding each component into a mixer, controlling a speed of the mixer at 1000-2000 r/min, then stirring and mixing for 20-50 min at a temperature of 100-140° C. to prepare a mixture, feeding the mixture into an extruder, controlling a processing temperature at 210-235° C. and a screw temperature at 210-240° C., and performing melt extrusion.

8. The composite aerogel panel of the aluminum alloy honeycomb panel according to claim 1, wherein a thickness of the aerogel thermal insulation coating layer is 2-4 mm, a thickness of the first aluminum alloy plate layer and the second aluminum alloy plate layer are the same, both being 0.3-0.8 mm, thicknesses of the first polypropylene hot-melt film layer, the second polypropylene hot-melt film layer, and the third polypropylene hot-melt film layer are the same, all being 0.02-0.08 mm, a thickness of the aluminum alloy honeycomb core layer is 8-17 mm, and a thickness of the polypropylene decorative film layer is 0.4-2 mm.

9. A method for preparing the composite aerogel panel of the aluminum alloy honeycomb panel according to claim 1, comprising the following steps:
  (1) taking aluminum foils, stacking and placing the aluminum foils in a criss-cross structure by using a manual laying process, ensuring no gaps between the aluminum foils and keeping all edges of the aluminum foils neat, to obtain the aluminum alloy honeycomb core layer;
  (2) respectively laying one polypropylene hot-melt film layer formed by melt extrusion on upper and lower sides of the aluminum alloy honeycomb core layer to form the first polypropylene hot-melt film layer and the second polypropylene hot-melt film layer on the upper and lower sides of the aluminum alloy honeycomb core layer respectively, and then laying the first aluminum alloy plate layer on the first polypropylene hot-melt film layer, laying the second aluminum alloy plate layer on the second polypropylene hot-melt film layer, and performing pre-pressing molding, wherein process parameters for the pre-pressing molding comprise a pre-pressing temperature of 90-110° C., a pressure of 1-1.5 MPa, and a time of 70-120 min;
  (3) laying another one polypropylene hot-melt film layer formed by the melt extrusion on the second aluminum alloy plate layer to form the third polypropylene hot-melt film layer, then coating the polypropylene decorative film layer on the third polypropylene hot-melt film layer, and performing hot-pressing molding, wherein process parameters for the hot-pressing molding comprise a hot-pressing temperature of 70-90° C., a pressure of 0.6-1 MPa, and a time of 30-60 min;
  (4) coating the coating for the aerogel thermal insulation coating layer on the first aluminum alloy plate layer, drying and solidifying at room temperature to form a pre-fabricated panel; and
  (5) conveying the pre-fabricated panel to a steam curing drying chamber for drying by a conveying device and then trimming to obtain the composite aerogel panel of the aluminum alloy honeycomb panel.

* * * * *